United States Patent [19]

Tolmie

[11] Patent Number: 4,755,347
[45] Date of Patent: Jul. 5, 1988

[54] DRY STORAGE OF IRRADIATED NUCLEAR FUEL

[75] Inventor: Robert D. Tolmie, Lowton, England

[73] Assignee: National Nuclear Corporation Limited, London, England

[21] Appl. No.: 889,358

[22] Filed: Jul. 25, 1986

Related U.S. Application Data

[63] Continuation of Ser. No. 463,675, Feb. 4, 1983, abandoned.

[30] Foreign Application Priority Data

Feb. 18, 1982 [GB] United Kingdom ................ 8204798

[51] Int. Cl.⁴ ............................................. G21F 7/00
[52] U.S. Cl. .................................... 376/272; 376/203; 414/146; 414/292
[58] Field of Search .................... 376/272, 261–264, 376/268–271, 203–206, 340–342; 414/292, 291, 146; 212/166; 294/86.12, 86.31, 906; 250/506.1, 507.1, 515.1

[56] References Cited

U.S. PATENT DOCUMENTS 4,260,312  4/1981  Hackney ........................ 250/506.1
4,281,691  8/1981  Goutard et al. .................... 414/146

FOREIGN PATENT DOCUMENTS 1234020  6/1971  United Kingdom ................ 376/272

Primary Examiner—Harvey E. Behrend
Assistant Examiner—Daniel Wasil
Attorney, Agent, or Firm—William R. Hinds

[57] ABSTRACT

A facility for posting irradiated fuel from a preparation chamber of a dry storage complex into storage canisters within a clean chamber and for posting contaminated canisters from a closed bucket in the clean chamber into the preparation chamber. The facility comprises two coaxial tubular port members extending from the preparation chamber into the clean chamber, the port members having masking means for the canister and bucket closures and means for withdrawing them into the preparation chamber.

2 Claims, 3 Drawing Sheets

DRY STORAGE OF IRRADIATED NUCLEAR FUEL

This is a continuation of application Ser. No. 463,675 filed Feb. 4, 1983, now abandoned.

BACKGROUND OF THE INVENTION

This invention relates to the dry storage of irradiated nuclear reactor fuel and highly active waste.

When fuel is withdrawn from a nuclear reactor it is highly radioactive and is usually stored for a period of at least 100 days in a cooling pond; the pond water serves to contain the radioactivity and to absorb the heat energy generated by decay of fission products. Pond water cooling is not attractive for long term storage of irradiated nuclear fuel, for example 50 to 100 years, because corrosion of the fuel cladding can occur and there are difficulties in maintaining the pool. An alternative method of storing irradiated nuclear fuel and highly active waste for the long term is to deposit the fuel or waste in concrete cells and cool it by circulating air. Preferably the circulation is effected by a passive system so that maintenance and reliability problems are minimised. To contain the active contamination fully it is advisable to house the nuclear fuel in hermetically sealed canisters of stainless or carbon steel and in British patent specification No. GB 2,096,938A there is disclosed a construction of cells for the dry storage of irradiated nuclear reactor fuel and highly active waste wherein prior to storage the fuel or waste is posted from a preparation chamber into a canister within an adjacent clean chamber, there being a posting facility comprising a tubular port member extending from the preparation chamber into the clean chamber, the tubular port member having a removable closure plug at the end adjacent the preparation chamber and an opening at the other end for embracing the body of a closed canister, the closure plug carrying retractable retention means within the tubular port member for retaining and withdrawing the canister closure into the tubular port member and the retaining means having a hood for sealably masking the outer surface of the canister closure. In operation, the canister sealably connected by the tubular port member forms an extension of the preparation chamber into which the canister closure, after removal from the canister, can be withdrawn with the grab to enable charging of the canister; masking the canister closure avoids contamination of its exterior surface.

FEATURES AND ASPECTS OF THE INVENTION

An object of the present invention is to extend the usefulness of the posting facility and according to the present invention in a construction of cells for the dry storage of irradiated nuclear reactor fuel and highly active waste wherein there is a posting facility for transferring radioactive material from a preparation chamber into a canister in a clean chamber in uncontaminating manner, the posting facility also has means for transferring a closed canister from the preparation chamber into a container in the clean chamber in uncontaminating manner.

The posting facility may comprise a tubular port member extending from the preparation cell into the clean cell, the tubular port member having a removable closure plug at the end adjacent the preparation cell and an opening at the other end for embracing the body of a closed canister, the closure plug carrying retractable retention means within the tubular port member for retaining and withdrawing the canister closure into the tubular port member, and the retaining means having a hood for sealably masking the outer surface of the canister closure, there being a second tubular port member disposed outside and coaxial with the first tubular port member and having an opening for sealably embracing a container for a canister, the first tubular member having an extension providing an opening for sealably embracing a closure of the container so that, from another aspect, the posting facility is capable of two alternative modes of operation whereby the canister or the container for the canister can be arranged to form an extension of the preparation cell, the closures for the canister and container being masked to prevent contamination of the external surfaces.

DESCRIPTION OF THE DRAWING

A construction of dry storage cells for irradiated nuclear fuel and highly active waste embodying the invention is described by way of example with reference to the accompanying drawings wherein.

DESCRIPTION OF THE PREFERRED EMBODIMENTS

Figure 1:
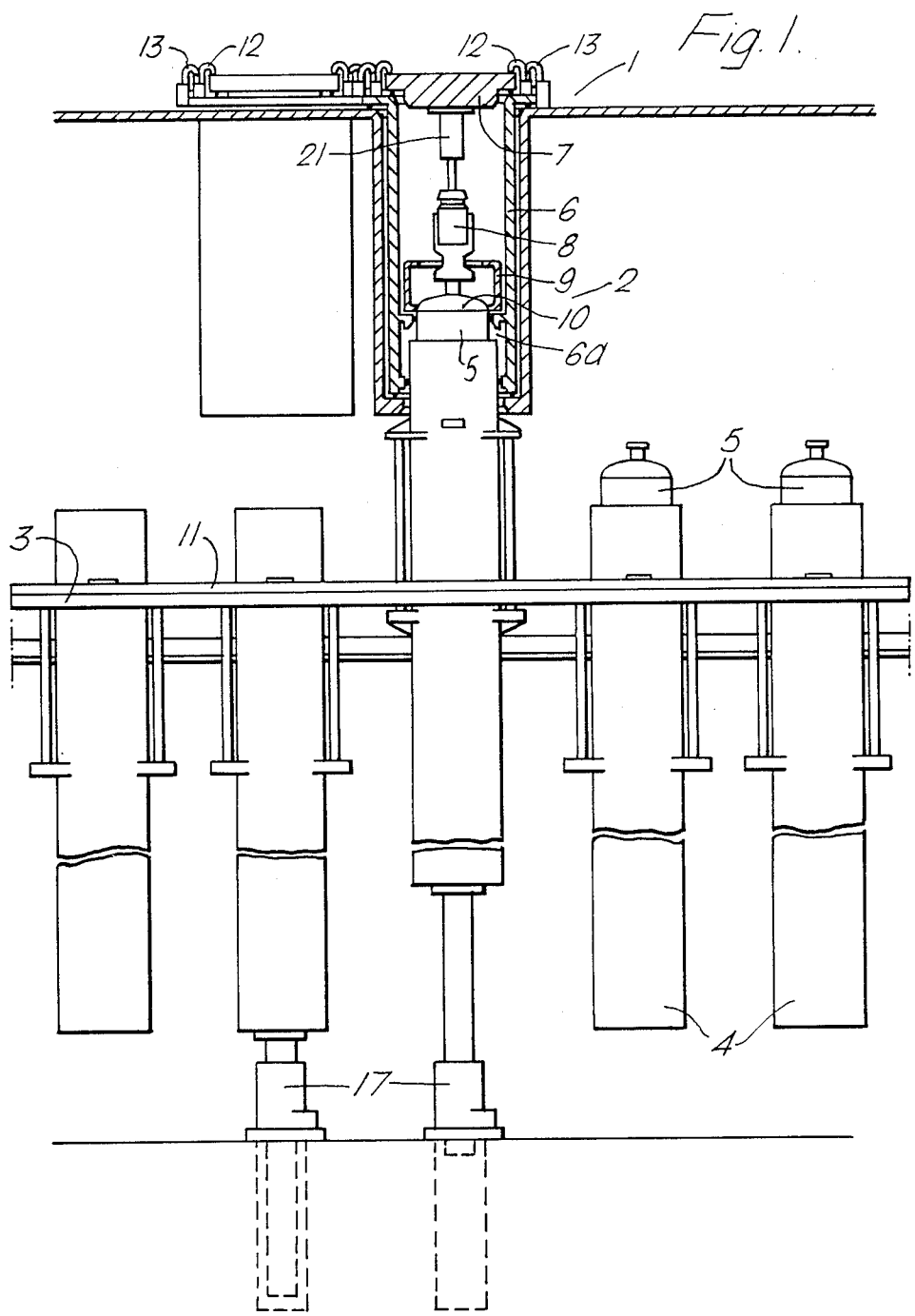
FIG. 1 is a sectional side view.

In the construction of dry storage cells shown in FIG. 1 there is a preparation chamber 1 and an adjacent clean chamber 2 constituting a transfer corridor. Within the corridor there is track 3 which supports a train of transfer containers or buckets 4 each containing a canister 5 for receiving irradiated nuclear fuel. The preparation chamber has two posting facilities each comprising a tubular port member 6 extending from the preparation chamber into the clean chamber, the port member being normally closed by a removable closure plug 7 adjacent the preparation chamber. The other end of the port member 6 has opening 6a for embracing the body of a closed canister 5. The closure plug 7 carries a retractable retention means in the form of a grab 8, with a linear actuator 21, within the tubular port member for gripping and withdrawing the canister closure into the tubular port member. The grab has a hood 9 for sealably masking the outer surface of the canister closure designated 10. In one alternative construction the retention means is a vacuum operable gripping device and in a second alternative construction is a magnetically operated gripping device.

In use the opening 6a of the tubular port member 6 seals about a canister 5 positioned immediately below and grab 8 with hood 9 is lowered within the tubular port member sealably to mask the canister closure 10. The grab is then engaged with the closure 10 and retracted to lift the closure clear of the canister. A grab (not shown) within the preparation chamber withdraws the closure plug 7 with a grab 8, hood 9 and a canister closure 10 into the preparation chamber the canister thereby forming an extension of the preparation chamber. Irradiated nuclear fuel, which may be in the form of a string of fuel elements, is then transferred into the canister whereupon the plug 7 with grab 8, hood 9 and canister closure 10 is restored to the tubular port member. The grab can then be extended to replace the closure 10 on the canister 5 whereupon the canister is retracted from the facility and removed for securing the closure by welding and checking for contamination of the external surfaces.

Figure 2:
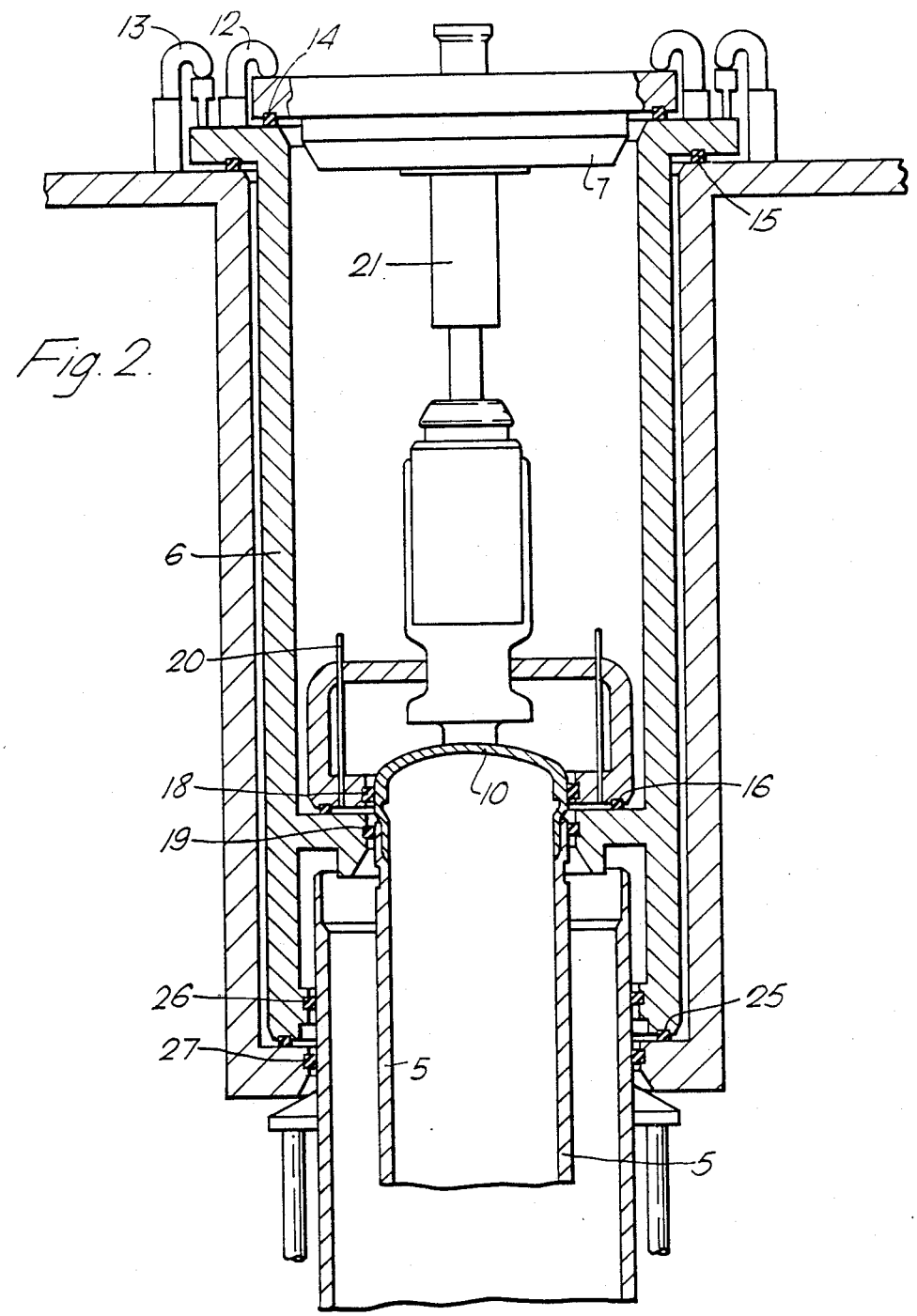
FIG. 2 is a sectional side view of a posting facility showing one mode of operation.

In greater detail, the buckets 4 are carried in a bogie 11 and are sequentially positioned below a selected one of the facilities. As shown in FIG. 2 the plug 7 is secured to the port opening of the preparation chamber by clamps 12 and 13 and seals 14, 15, 16 are provided to ensure that contaminated surfaces of the port are not exposed to the clean chamber. The bucket situated below the facility is then raised by a jack 17 (FIG. 1) to engage the opening 6a with the canister carried in the bucket. A seal designated 18 is provided to seal the canister closure with the hood 9 and a seal designated 19 to seal the canister to the port member 6 following which the interspace bounded by the seals 16, 18 and 19 is vacuum tested by way of a connection 20 to check the efficiency of the seals. The seal 16 is then released and, as described hereinbefore, the grab 8 and linear actuator 21 remove the closure 10 from the canister whereupon the clamps 12 can be released and the assembly of plug 7, actuator 21, grab 8, hood 9 and closure 10 withdrawn into the preparation chamber. Irradiated fuel is then posted into the canister and the plug, actuator, grab, hood and closure assembly, replaced. After replacement the clamp 12 is re-engaged and the closure 10 is replaced on the canister by the actuator, seal 16 re-engaged and vacuum tested. The interspace is decontaminated by gas purges and seals 18, 19 released whereupon the bucket and canister is lowered into the transfer bogie and the canister subsequently transported to a closure welding facility.

Figure 3:
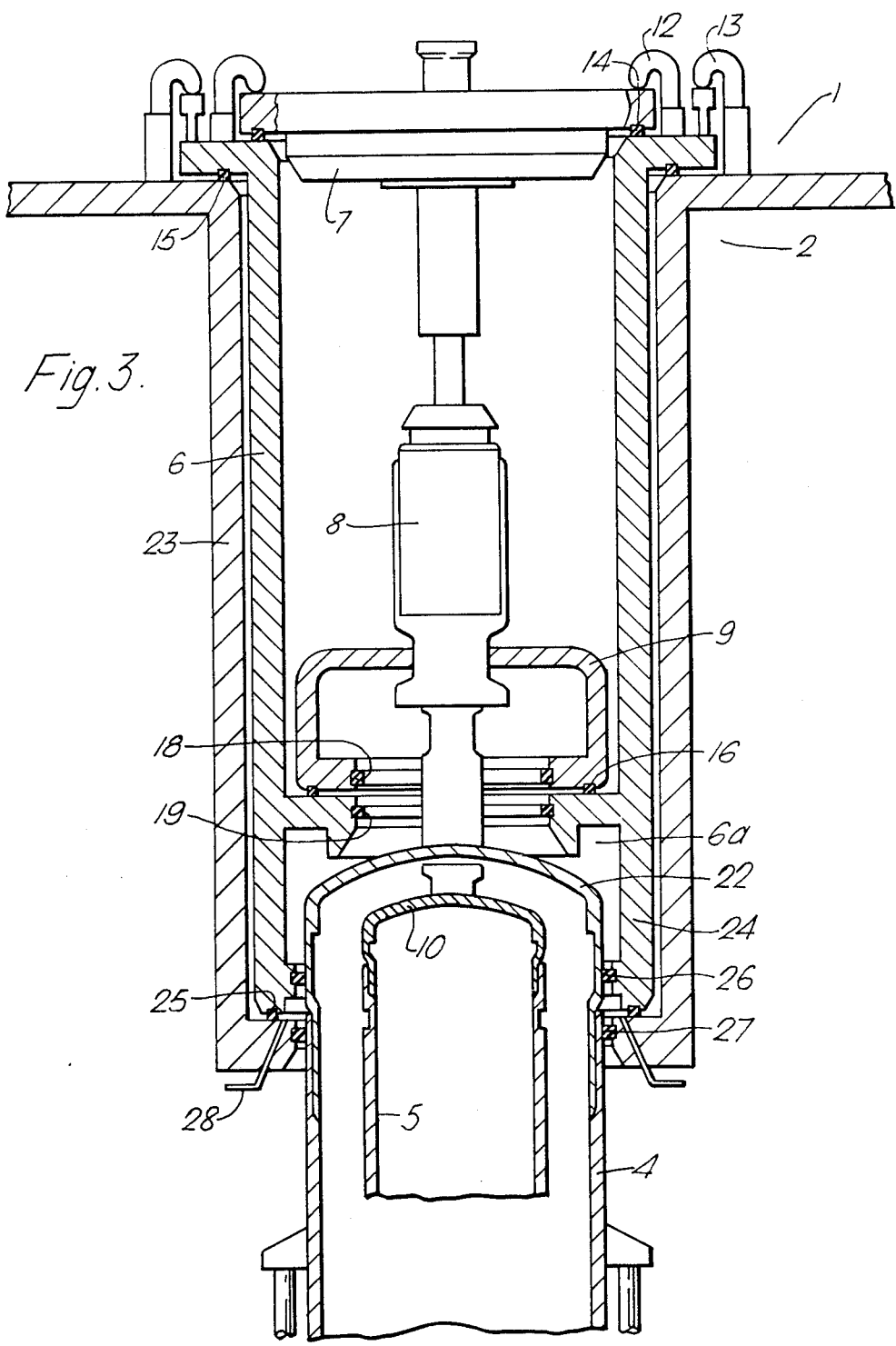
FIG. 3 is a sectional side view showing a second mode of operation.

FIG. 3 illustrates an additional facility for handling defective canisters which may be required to be disposed of in the preparation chamber 1. Defective canisters are returned to the facility within a bucket 4 having a closure 22 fitted so that contamination is contained within the bucket. The procedure for withdrawing the defective canister into the preparation chamber is generally similar to the foregoing procedure for withdrawing a canister closure into the fuel preparation chamber.

The facility provides a second tubular port member 23 integral with the barrier wall between the preparation chamber 1 and the clean chamber 2 and extending co-axially into the clean chamber. The tubular port member 6 has an extension 24 and there are seals 25, 26, 27 similar to those designated 16, 18, 19 and a vacuum connection 28.

The seals 18, 19, 26, 27 are of hollow section and are connectable to a vacuum source by selector valves (not shown). In their normal state the seals can embrace the canister 5 and container 4 in sealing manner but on connection to the vacuum source the seals are retracted into their housings to release the canister and container so that linear movement of the canister and container can take place out of contact with the seals. In an alternative construction the seals are arranged to sealingly embrace the canister and container when they are expanded by gas pressure and are retracted from contact at atmospheric pressure.

In operation the posting port is sealed by seals 14, 15, 16 and 25 to ensure that contaminated surfaces of the port are not exposed to the clean chamber and the plug 7 is secured by clamps 12, 13. The bucket is raised by the jack 17 to engage the seals 26, 27 and vacuum tests made. The seal 25 is then released and the closure removal grab with its actuator 21 then withdraw the closure 22 into the first tubular port member 6 and after releasing the clamps 13 the assembly of tubular member 6, actuator 21, grab 8 and closure 22 can be lifted into the fuel preparation chamber. The canister 5 is then withdrawn into the preparation chamber from the bucket 4 and the assembly replaced in the outer sleeve 23.

After replacement the clamp 13 is re-engaged and closure 22 is replaced on the bucket by the actuator 21. Seal 25 is re-engaged and vacuum tested. The interspace is decontaminated as previously described and the bucket subsequently transported for further decontamination.

We claim:

1. A construction of cells for the dry storage of irradiated nuclear reactor fuel and highly active waste, including canisters and containers for the canisters, together with respective closures for the canisters and the containers, wherein there is a posting facility for transferring radioactive material from a preparation chamber into a canister in a clean chamber without contaminating the clean chamber, the posting facility comprising means for selectively sealingly masking the outer surface of either of the closure cover of a canister or the closure cover of a container for housing the canister so as to prevent contamination of the external surface of the closure cover while so masked, means for selectively withdrawing either of the canister closure cover or the container closure cover while so sealingly masked into the preparation chamber independently of and apart from the respective canister or container, means for sealingly engaging the outer surface of the body of the canister to shield it from the preparation chamber, and means for sealingly engaging the outer surface of the body of a container for the canister to shield it from the preparation chamber, such that when a respective closure cover is withdrawn into the preparation chamber the interior of the respective canister or container forms an extension of the preparation chamber such that radioactive material is transferable from the preparation chamber into a canister in the clean chamber without exposing the clean chamber to contamination, and a closed canister is transferable from the preparation chamber into a container in the clean chamber without exposing the clean chamber to contamination.

2. A construction of cells for the dry storage of irradiated nuclear reactor fuel or highly active waste, the construction comprising a preparation chamber for housing exposed radioactive material, a clean chamber adjacent the preparation chamber for housing enclosed radioactive material, canisters for holding radioactive material, containers for the canisters, and respective closure covers for the canisters and containers, and a posting facility for transferring radioactive material between the chambers, the posting facility comprising a first tubular port member extending from the preparation chamber into the clean chamber, a removable closure plug at the end of the first tubular port member adjacent the preparation chamber, a sealing means within the other end of the first tubular port member for embracing the body of a canister, retractable retention means carried by the closure plug within the first tubular port member for retaining and withdrawing a canister closure cover independently of the canister, a hood carried by the retention means disposed for sealably masking the outer surface of the canister closure cover, a second tubular port member extending at one end from the preparation chamber into the clean chamber and disposed co-axially outside of the first tubular port member, sealing means within the other end of the second tubular port member relatively away from the preparation chamber for embracing the body of a container for a canister, and means for sealably masking the outer surface of a closure cover of the container within an extension of the first tubular port member, said retractable retention means comprising means for selectively retaining and withdrawing the canister closure cover or the container closure cover while so masked into the preparation chamber independently of and apart from the respective canister or container, such that radioactive material is transferable from the preparation chamber into a canister in the clean chamber, and a closed canister is transferable from the preparation chamber into a container in the clean chamber, both without exposing the clean chamber to contamination, and either a cansiter or a container can form an extension of the preparation chamber.

* * * * *